Sept. 25, 1928.  1,685,537
W. S. GARLAND
CIRCUIT CONTROLLER
Original Filed Feb. 12, 1926    2 Sheets-Sheet 1
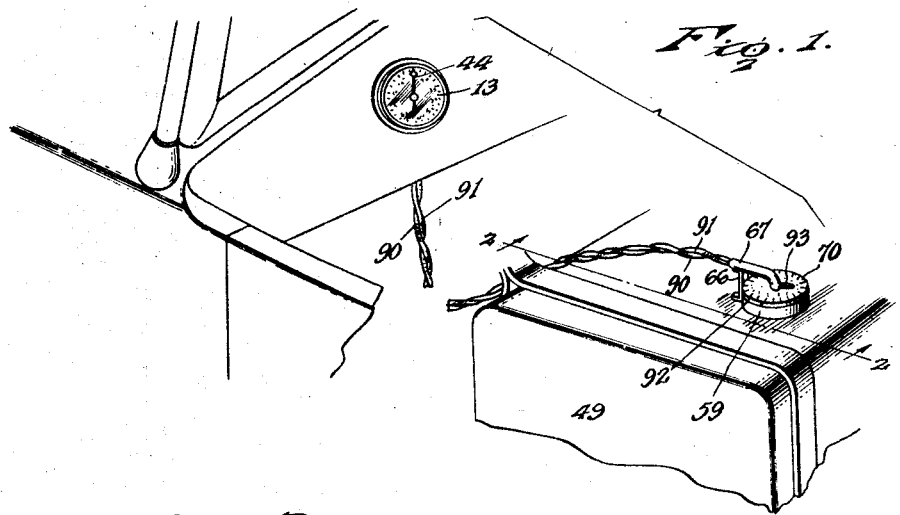
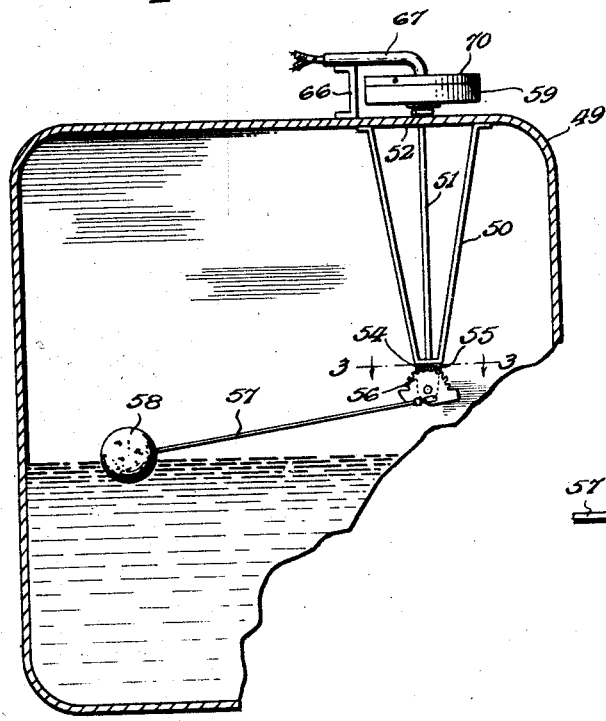
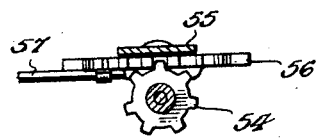
Inventor
W. S. Garland.
By Lacey & Lacey, Attorneys Sept. 25, 1928.
W. S. GARLAND
1,685,537
CIRCUIT CONTROLLER
Original Filed Feb. 12, 1926   2 Sheets-Sheet 2
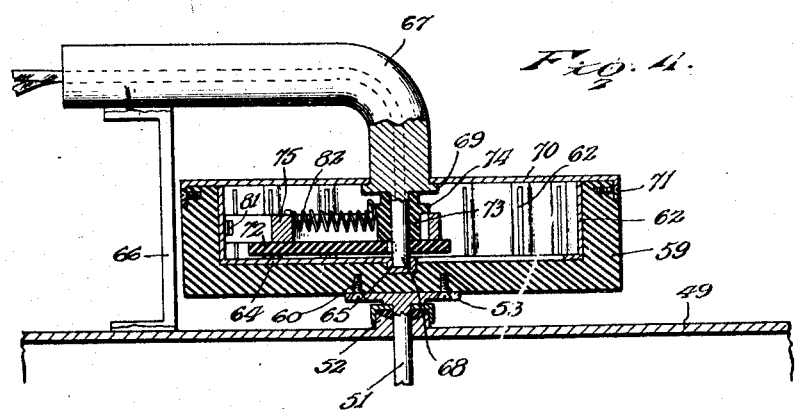
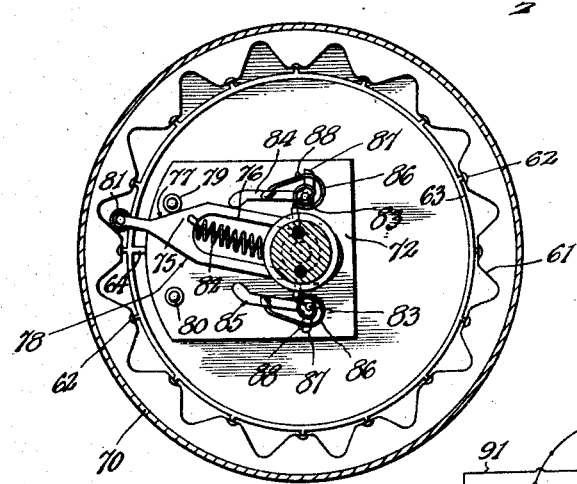
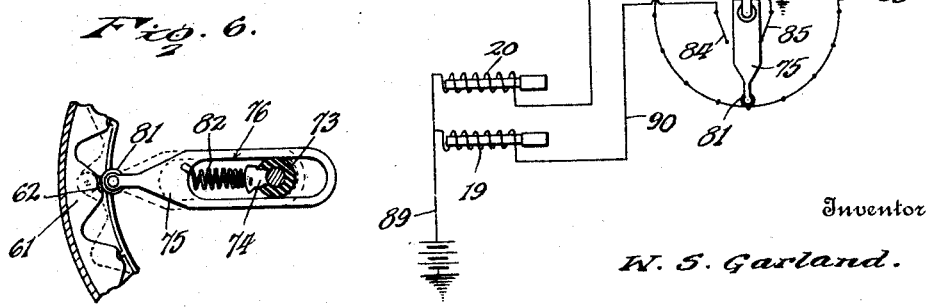
Inventor
W. S. Garland.
By Lacey & Lacey, Attorneys Patented Sept. 25, 1928.

1,685,537

UNITED STATES PATENT OFFICE.

WALTER S. GARLAND, OF WASHINGTON, DISTRICT OF COLUMBIA.

CIRCUIT CONTROLLER.

Original application filed February 12, 1926, Serial No. 87,873. Divided and this application filed August 16, 1926. Serial No. 129,478.

This invention relates to an improved float operated circuit controller, being a division of my co-pending application for gage, filed February 12, 1926, Serial No. 87,873.

The invention seeks, among other objects, to provide a circuit controller wherein, as each gallon of liquid or other chosen unit of measure of liquid is introduced into a motor vehicle fuel tank, a circuit will be closed by the device for actuating an indicator on the instrument board of the vehicle to register the increase while, as each gallon of liquid is withdrawn from the tank, a circuit will be closed by the device for actuating the indicator to register the decrease.

And the invention seeks as a further object to provide a device which will function to prevent false actuation of the indicator with a consequent false reading thereof, and wherein the circuit closing parts of the device will be completely isolated from the fuel tank so that all danger of fire will be avoided.

Other objects of the invention not specifically mentioned in the foregoing will appear during the course of the following description.

In the accompanying drawings:

Figure 1 is a perspective view showing my improved controller in connection with the fuel tank of a motor vehicle, the indicator of my prior application, previously identified, being also illustrated.

Figure 2 is a vertical sectional view on the line 2—2 of Figure 1, looking in the direction indicated by the arrows, and showing the mounting of the circuit closer of the device.

Figure 3 is a detail sectional view on the line 3—3 of Figure 2, looking in the direction indicated by the arrows.

Figure 4 is a transverse vertical sectional view through the circuit closer.

Figure 5 is a horizontal sectional view through the circuit closer.

Figure 6 is a detail plan view particularly showing the brush of the circuit closer.

Figure 7 is a diagrammatic view showing the electrical connections employed.

In Figure 1 of the drawings, I have illustrated my improved circuit controller in connection with the fuel tank 49 of a conventional motor vehicle and have also shown on the instrument board of the vehicle, the indicator 13 illustrated in my pending application, previously identified. In order that the present improvements may be readily understood it may be noted that this indicator includes a pointer 44 which is movable in one direction by an electromagnet 19, see Figure 7, for indicating an increase of fuel in the tank, and is movable in the opposite direction by a similar magnet 20 for indicating a decrease of fuel in the tank.

Coming now more particularly to the subject of the present invention, I employ within the tank 49, a depending bracket 50, and journaled near its lower end through said bracket is a shaft 51, the upper end of which is, as seen in Figure 4, journaled through a suitable gland 52 upon the top wall of the tank. At its upper end, the shaft is provided with a head 53, and fixed to the lower end of the shaft is a gear 54. Depending from the lower end of the bracket 50 is an offset lug 55, and pivoted upon said lug to mesh with the gear 54 is a gear segment 56. Fixed at one end to said segment is a float arm 57 and suitably connected to the free end of said arm is an appropriate float 58. Thus, as the float rises and falls, the segment 56 will be rocked for rotating the shaft 51.

Mounted upon the head 53 of the shaft 51 is a preferably cylindrical casing 59 of suitable insulating material and detachably connecting the casing with the head are screws 60 sunk into the bottom wall of the casing. As will be observed, these screws terminate short of the upper face of said wall so that the parts within the casing will thus be effectually insulated by the casing with respect to the shaft 51. As shown in Figure 5, the side wall of the casing is corrugated internally to form an annular series of cams or teeth 61, and sunk into said cams at the summits thereof are medially disposed contacts 62 lying flush with the summit faces of the cams. These contacts are all electrically connected at their lower ends by a conductor ring 63 which rests against the bottom of the casing, and extending radially inward from said ring is a conductor 64 which, as seen in Figure 4, terminates in a socket 65 countersunk in the bottom wall of the casing axially thereof.

Fixed to the tank 49 adjacent the casing 59 is an upstanding bracket 66 to which is rigidly attached an arm 67 terminating at its free end in an elbow which extends downwardly within the casing axially thereof. Depending from the free end of the arm is a reduced stem 68 which rotatably fits in the socket 65, and formed on the arm at the base of said stem is an annular flange 69. Rotatable on the arm is a cover 70 which rests against the flange 69 and frictionally fits tightly over the casing, closing the casing, screws or like fastening devices 71 being employed for securing the cover to the casing.

Fixed to the stem 68 near its lower end is an insulating plate 72, and fitting the stem to rest upon said plate is an insulating bushing 73 provided near its upper end with an annular flange 74. Resting on the plate to be slidably supported thereby is a brush 75 slotted, as indicated at 76, to freely accommodate the bushing 73 and, as will be observed upon reference to Figure 5, the flange 74 of the bushing overhangs the brush for maintaining the brush seated against the plate 72. At its forward end, the brush is tapered to provide beveled side edges 77 and 78 and mounted upon the plate 72 are upstanding rollers 79 and 80 to coact with said edges of the brush. Journaled upon the brush at its forward end is a contact roller 81 to travel over the cams 61 of the casing 59 as said casing is rotated, and pressing the brush forwardly so that the contact roller will be urged to coact with said cams, is a spring 82, one end of which is fixed to the brush at the forward end of the slot 76 while the opposite end of said spring is, as seen in Figure 4, attached to the flange 74 of the bushing 73. Upstanding from the plate 72 at opposite sides of the rear end of the brush are posts 83, and pivoted upon said posts are contact members 84 and 85, respectively. Fixed at corresponding ends thereof to the posts 83 are springs 86, the opposite ends of which are attached to the members 84 and 85 for swinging said members inwardly toward the brush 75, and projecting laterally from the hub ends of said members are lugs 87 to coact with stop pins 88 on the plate 72 for limiting the contact members in their inward swinging movement.

As shown in Figure 7, corresponding terminals of the electro-magnets 19 and 20 of the indicator are connected by a wire 89 with one side of the battery of the vehicle or other suitable source of electrical energy thereon, the other side of the battery being grounded to the frame of the vehicle. Leading from the magnet 19 to the contact member 84 is a wire 90, and leading from the magnet 20 to the contact member 85 is a wire 91. As shown in Figures 4 and 5, the arm 67 of the circuit closer is provided with suitable channels to accommodate the wires 90 and 91 and, preferably, these wires are attached to the posts 83, the wires being insulated from the arm. However, since the stem 68 of the arm is in direct contact with the socket 65, this arm provides a ground connection through the bracket 66 and tank 49 for all of the contacts 62.

As will now be seen, as fuel is introduced into the tank 49 and the float 58 is caused to rise, the casing 59 will be turned in a clockwise direction. As the casing is thus rotated, each of the cams 61 will, as it engages the roller 81 of the brush 75, swing the brush laterally, as seen in Figure 5, into engagement with the contact member 84, which member will be rocked to accommodate the lateral movement of the brush. However, the contact member 85 will, when the brush is thus swung, be held away from the brush by the engagement of the lug 87 of said member with the adjacent stop pin 88. As will be observed, lateral movement of the brush is limited by the engagement of the beveled edge 77 of the brush with the roller 79, when, as the rotation of the casing continues and the active cam is advanced in front of the contact roller 81, the cam will, as shown in detail in Figure 6, shift the brush rearwardly or inwardly on the bushing 73 until said roller reaches the summit of the cam. The spring pressure on the contact member 84 will then rock the brush laterally in the opposite direction and snap the roller 81 across the summit of the cam into the notch at the rear of the cam. As the roller 81 thus travels across the summit of the cam said roller will, of course, engage the contact 62 of said cam, when current will flow from the battery through the wire 89 and through the magnet 19 and the wire 90 to the contact member 84, thence through said member, the brush, the roller 81, and the contact member of said cam to the ring 63 to return to the battery through the ground connection afforded by the ring. The cams 61 are so spaced that, as each gallon of fuel is introduced into the tank 49, the float 58 will be lifted sufficiently to advance one of the cams past the brush so that, as will be seen, upon the closing of the circuit through the magnet 19, as just previously noted the pointer 44 will be actuated to register the increase in the quantity of fuel in the tank.

As the fuel is used from the tank 49 and the float 58 drops, the casing 59 will be turned in a counter-clockwise direction so that as each of the cams 61 is moved into engagement with the contact roller 81 of the brush 75, said brush will be rocked laterally into engagement with the contact member 85 and out of engagement with the contact member 84 until the beveled edge 78 of the brush strikes the roller 80. As the movement of the cam continues, the brush will then be shifted endwise until the contact roller reaches the summit of the cam, when the spring pressure on the contact member 85 will serve to rock the brush laterally and snap the contact roller thereof across the summit of the cam. The contact roller will thus be caused to engage the contact member 62 of said cam for closing a circuit from the battery through the wire 89, and through the electro-magnet 20 and the wire 91 to the contact member 85, thence through said contact member, the brush and said contact of the cam, to return to the battery through the ground connection afforded by the conductor ring 63. The magnet 20 will accordingly be energized so that the pointer 44 will be turned in a counter-clockwise direction to register the gallon decrease in the quantity of fuel in the tank. Thus, the circuit closer will function to energize the indicator so that the indicator will be caused to register increase in quantity of fuel in the tank or decrease in said quantity. Should the fuel in the tank be shifted, as by tilting of the vehicle, for elevating the float, so that, as a consequence, the indicator would be actuated to show an increase in the quantity of fuel in the tank, the float will, when the fuel again assumes its normal disposition within the tank, drop so that the indicator will be actuated for returning the pointer to its original position. As will be noted, each of the contact members 62 occupies only the middle portion of the summit of the adjacent cam. Thus, the contact roller 81 cannot be shifted from any one of the notches between the cams to the summit of any one of said cams to engage the contact of said cam and return to said notch, since, once the contact roller reaches the summit of a cam, the spring tension on the brush exerted by either of the spring pressed contact members 84 and 85, will rock the brush and snap the contact roller across the cam. False actuation of the indicator with consequent false reading thereof will accordingly be obviated.

As shown in Figure 1, the cover 70 of the casing 59 is preferably graduated to provide a dial 92 like the dial 13 while the arm 67 is formed with a pointer 93 to cooperate with said dial for indicating the quantity of fuel in the tank. Thus, the quantity of fuel actually in the tank may be readily determined as the tank is being filled.

Having thus described the invention, I claim:

1. A circuit controller including a rotatable shaft, means carried thereby and provided with a surface having a series of cams, a contact carried by each of said cams, contact members insulated with respect to said contacts, a pivotally and slidably mounted brush urged to coact with said surface and movable both pivotally and slidably by each cam as said shaft is rotated in either one direction or the other to close a circuit through the contact of such cam and one of said contact members respectively, and float-operated means for rotating said shaft.

2. A circuit controller including a rotatable shaft, a casing carried thereby and provided with a surface having a series of cams, a contact carried by each of said cams at the summit thereof, contact members insulated with respect to said contacts, a pivotally and slidably mounted brush urged to coact with said surface and movable both pivotally and slidably by each cam as said shaft is rotated in either one direction or the other to close a circuit through the contact of such cam and one of said contact members respectively, and float operated means for rotating said shaft.

3. A circuit controller including a rotatable shaft, a casing carried thereby and provided with a surface having a series of cams, a contact carried by each of said cams at the summit thereof, an arm extending into the casing, an insulating plate fixed to said arm, spaced contact members carried by said plate, a brush slidably and pivotally mounted upon said arm and urged to coact with said surface, the brush being movable by each of said cams as said shaft is rotated in either one direction or the other to close a circuit through the contact of such cam and one of said contact members respectively, and float-operated means for rotating said shaft.

4. A circuit controller including a rotatable shaft, means carried thereby and provided with a surface having a series of cams, a contact carried by each of said cams at the summit thereof, spring pressed contact members insulated with respect to said contacts, a brush urged to coact with said surface and movable by each of said cams as said shaft is rotated in either one direction or the other to close a circuit through the contact of such cam and one of said contact members respectively, each of said contact members being movable to snap the brush across the summit of any one of said cams, and float-operated means for rotating said shaft.

5. In a circuit controller, spaced contact members, a pivotally and slidably mounted brush extending therebetween, and a cam having a contact and revoluble in either one direction or the other for slidably and pivotally shifting the brush to close a circuit through the contact of said cam and one of said contact members respectively.

6. A circuit controller including a rotatable element having a surface provided with a series of cams, a contact carried by each of said cams, spaced contact members, and a slidably and pivotally mounted brush urged to coact with said surface and slidably and pivotally movable by each cam as said element is rotated in either one direction or the other to close a circuit through the contact of such cam and one of said contact members respectively.

7. A circuit closer including a rotatable element having a surface provided with a series of cams, a contact carried by each cam, spaced spring actuated contact members, and a slidably and pivotally mounted brush extending between said members and urged to coact with said surface, the brush being slidably and pivotally movable by each cam, as said element is rotated in either one direction or the other to close a circuit through such cam and one of said contact members respectively, the contact members being movable to rock the brush in either one direction or the other selectively across the summit of each cam.

8. A circuit controller including a rotatable casing having a surface provided with a series of cams, a contact carried by each of said cams, an arm extending into the casing, a plate fixed to said arm, spring pressed contact members pivoted upon said plate, and a brush slidably and pivotally mounted upon the arm and urged to coact with said surface, the brush being slidably and pivotally movable by each of said cams as said casing is rotated in either one direction or the other for closing a circuit through the contact of such cam and one of said contact members respectively.

9. A circuit controller including a rotatable casing having a surface provided with a series of cams, a contact carried by each of said cams at the summit thereof, an arm extending into the casing and having electrical connection with all of said contacts, an insulating plate fixed to the arm, spaced contacts carried by said plate, an insulating bushing mounted upon the arm, and a brush slidably and pivotally mounted upon said bushing and urged to coact with said surface, the arm being slidably and pivotally movable by each of said cams as the casing is rotated in either one direction or the other for closing a circuit through the contact of such cam and one of said contact members respectively.

10. A circuit controller comprising a circuit closing member mounted to receive both a pivotal and a longitudinal movement, contacts at opposite sides of the circuit closing member, a support adapted to receive a forward and a reverse movement, spaced contacts on the support, and means between the spaced contacts for imparting a combined pivotal and longitudinal movement to the said circuit closing member at each movement of the said support in either direction.

11. A circuit controller comprising a circuit closing member mounted to receive both a pivotal and a longitudinal reciprocatory movement, contacts at opposite sides of the circuit closing member, a plurality of spaced contacts electrically engageable by the circuit closing member, a support for the said spaced contacts, means for imparting a forward and a reverse movement to the said support, and means on the support between the contacts thereof for imparting both a pivotal and a longitudinal movement to the aforesaid circuit closing member.

In testimony whereof I affix my signature.

WALTER S. GARLAND. [L. S.]